INVENTOR
ROBERT SCHWARZ, JR.
BY
Kane, Dalsimer & Kane
ATTORNEYS

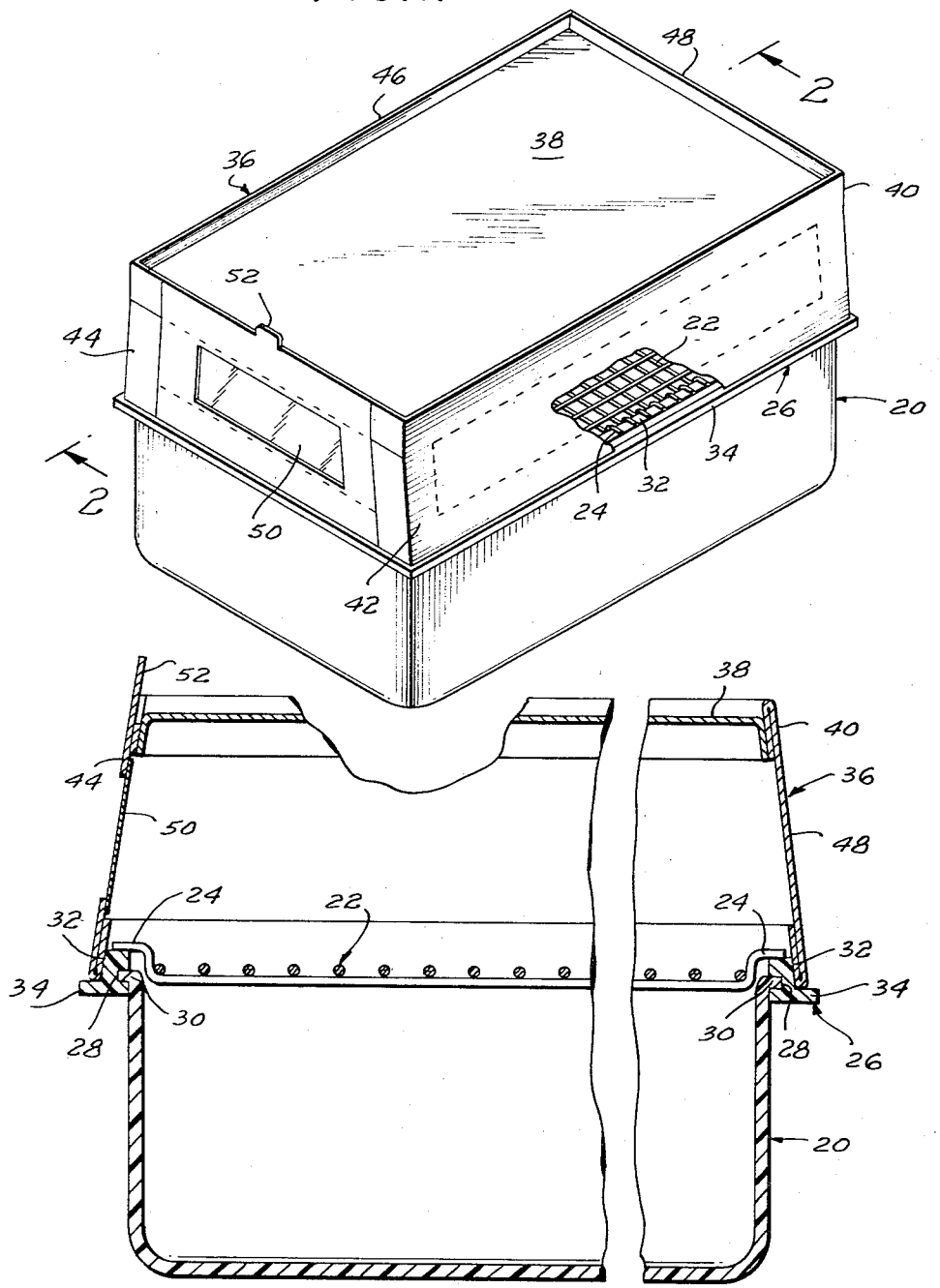

Sept. 26, 1967 R. SCHWARZ, JR 3,343,520
ANIMAL CAGE FILTER COVER
Filed June 3, 1965 5 Sheets-Sheet 3

INVENTOR
ROBERT SCHWARZ, JR.
BY
Kane, Dalsimer & Kane
ATTORNEYS

Sept. 26, 1967

R. SCHWARZ, JR 3,343,520

ANIMAL CAGE FILTER COVER

Filed June 3, 1965

INVENTOR
ROBERT SCHWARZ, JR.

BY
Kane, Dalsimer + Kane
ATTORNEYS

Sept. 26, 1967 R. SCHWARZ, JR 3,343,520
ANIMAL CAGE FILTER COVER
Filed June 3, 1965 5 Sheets-Sheet 5

INVENTOR
ROBERT SCHWARZ, JR.
BY
Kane, Dalsimer + Kane
ATTORNEYS

United States Patent Office 3,343,520
Patented Sept. 26, 1967

3,343,520
ANIMAL CAGE FILTER COVER
Robert Schwarz, Jr., Tenafly, N.J., assignor to Becton, Dickinson and Company, East Rutherford, N.J., a corporation of New Jersey
Filed June 3, 1965, Ser. No. 460,965
29 Claims. (Cl. 119—15)

ABSTRACT OF THE DISCLOSURE

A preformed self-supporting filter cover for animal cages constructed of a relatively thin sheet of air and gas pervious imperforate material of low structural strength arranged to filter air-borne virus and disease transmitting particles. The cover includes a raised top and downwardly depending sides, the lower edge of the sides being arranged to sealably receive the top of the tray of the cage with which the cover is to be used. Integral strengthening means are provided on the cover to strengthen and rigidify the sheet material in its predetermined configuration.

---

This invention relates to animal cages and, more particularly, to a disposable filter cover for animal cages.

An ever increasing need and use of experimental animals has developed in the recent past, specifically mice. The numbers and colonies of mice now being bred and raised have reached such proportion that efficient handling and space utilization has given rise to the problems incident to the breeding of better specimens and healthier mice. With colonies of mice being raised in confined areas, infection in one or more mice may result in major loss of a colony.

It has been found that air-borne viruses and diseases are frequently responsible for major losses in a colony of mice being bred along with illnesses that may detract from the health and regimen of the mice. Serious effects or infection are more pronounced during weaning of litters. The air-borne viruses and diseases are carried by air currents and atmosphere to which the newborn are subjected. The present invention seeks to control and minimize many diseases including diarrheal infections, an air-borne disease, which is common in infant mice.

It has been found that the use of filters for air-borne viruses and diseases have dramatically reduced illlness and death of mice particularly during the weaning stages.

It is, therefore, a principal object of this invention to provide a preformed filter cap or cover for standard animal cages which saves time, trouble and expense in controlling diarrheal disease and other airborne infections of infant mice.

Another object is to provide a disposable filter cover which not only provides for healthier animals at relatively low cost but also permits practical replacement, at reasonable intervals and at the same time controls dust, rendering work areas and floors cleaner, therefore reducing load on air-conditioning filters.

A further object is to provide a filter cover for animal cages which contributes to a desired measure or level of quality control on laboratory animals without having to be concerned with the danger of infection and the possible demise of newborn mice between inspections of colonies which are generally conducted on a weekly basis.

These and other objects and advantages are most effectively attained by providing a standard filter cage generally having a tray for the animals and screen or other wire grid placed over the top of the tray, with a preformed filter cap or cover. This filter cover is not required to be used with or in conjunction with tape but cooperates with a sealing ring or gasket disposed around the upper lip of the tray. An essentially truncated pyramidal configuration is imparted to the filter cover in which a base panel has extending therefrom in a substantially divergent relationship transverse side panels constituting a peripheral apron. A window may be provided in one of the sides of the apron for viewing the interior of the cage.

In order to contribute to the disposable and low-cost nature of filter cover, relatively thin filter material having the desired filtration properties is selected for the filter cover. In order to permit the filter cover to be self-supporting during storage, shipping and actual use, rigidifying means or structure is associated with the sheet material. This may partake of one of a number of forms and, as will be disclosed in detail herein, may be provided by at least two plys of the sheet material along predetermined zones of the cover to increase the thickness of the cover along these zones. In order to facilitate the assembly and construction of a filter cover of this type, the sheet material may be formed of a compressed fibrous material including fiberglass and an organic resin having thermoplastic properties which, when subjected to a predetermined amount of heat, will cause the superimposed plys to adhere to one another. On the other hand, the rigidifying structure may be incorporated by a silk screening technique which supplies added thickness along predetermined zones. This silk screened material can either be of the same filter material or other material which does not destroy the desired filtration characteristics of the filter cover.

A somewhat preferred embodiment takes advantage of the rigid nature of a pair of side panels one of which may constitute a transparent window. In this instance, the construction enables the cover to be folded into a collapsed condition for facilitating storage and shipping.

Reference is now made to the drawings which illustrate several somewhat preferred embodiments of this invention and in which:

FIG. 1 is a perspective view of an animal cage having a filter cover in accordance with the invention with part of the filter cover broken away and removed to show the interior of the cage;

FIG. 2 is an enlarged sectional view taken along the line 2—2 of FIG. 1;

Figure 3:
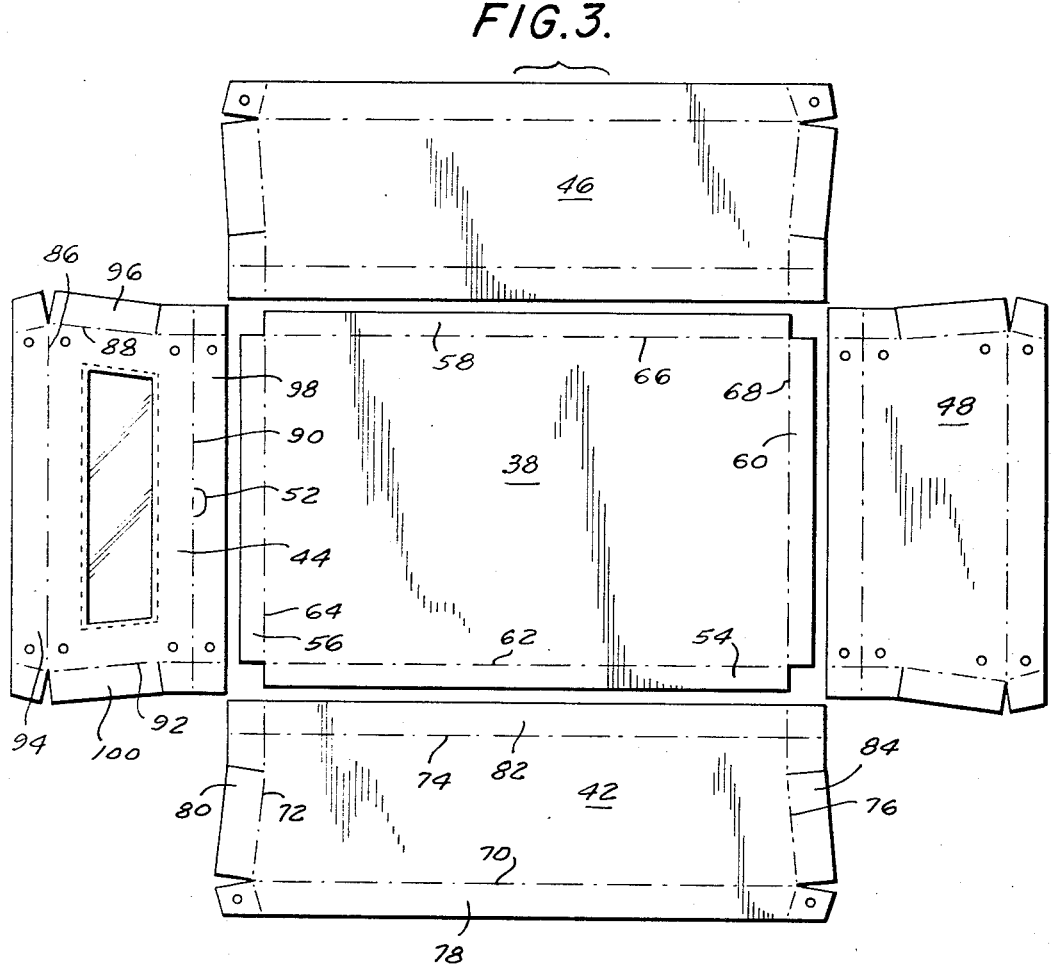
FIG. 3 is a top plan view of the parts of the filter cover prior to folding assembly and erection into the desired configuration of filter cover.
Figure 7:
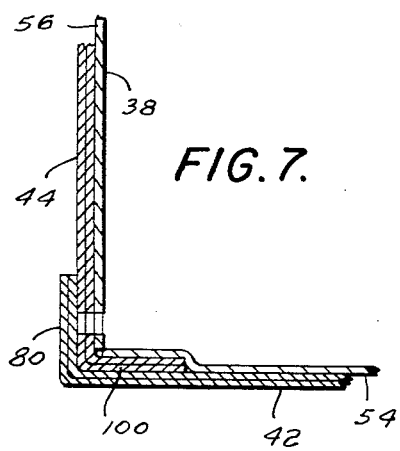
FIG. 7 is a fragmentary sectional view taken along the line 7—7 of FIG. 6.
Figure 8:
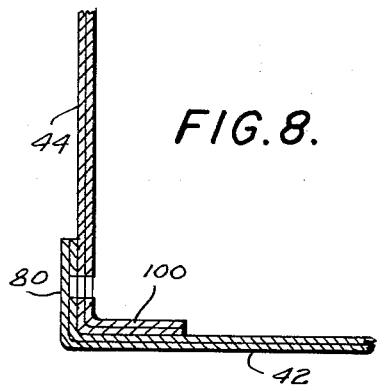
FIG. 8 is a fragmentary sectional view taken along the line 8—8 of FIG. 6.
Figure 4:
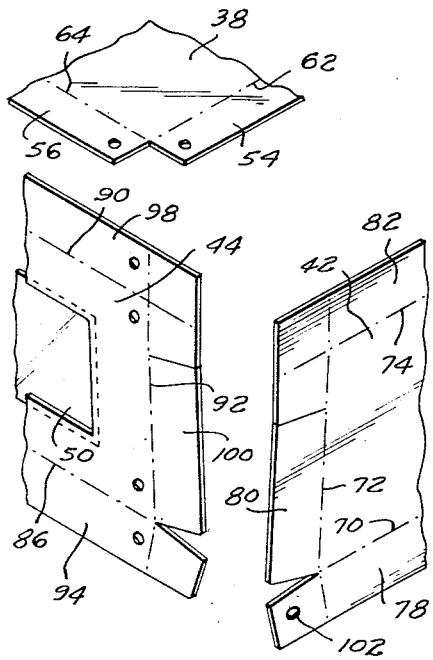
FIG. 4 is an enlarged fragmentary perspective view of the separated parts of the disassembled filter cover prior to assembly and erection.

Referring now to FIGS. 1 and 2 in particular, an animal cage in accordance with the teachings of this invention will include a lower standard tray 20. This tray is designed and equipped with bedding, food and the like to sustain a number of contained animals. A screen or wire grid 22 is placed across the open top of the tray 20 and is provided with a raised peripheral extension 24 adapted to conveniently rest on an adaptor ring or gasket 26, as shown. This ring is provided with a recess 28 adapted to receive the peripheral bead or lateral flange 30 at the top of the tray 20. The ring 26 is also provided with a downwardly and outwardly tapered side 32 which extends into a lower and outwardly extending shoulder 34. This shoulder and tapered side cooperate in receiving in sealing fashion the disposable filter cover 36 of this invention.

The present invention contemplates utilizing filter material composed of fibers having the desired filtration properties. Included along with these fibers in relatively small amounts are thermoplastic fibers that are capable of bonding to one another when contacted and then subjected to heat. In a successful application of this invention, the filter cover was constructed of glass fibers and polyvinyl chloride was incorporated in minor proportions which was held at a minimum and was only present in amounts sufficient to give the desired heat sealing of overlapped zones.

The filter cover 36 is designed and disposed to effectively filter and screen airborne virus and disease and, at the same time, keep within the cage dust and the like created by food, waste and other matter that may be rendered airborne by active mice which in general feverishly scramble at night because of their nocturnal habits and disposition. Accordingly, the filter cover includes a base panel 38 of generally rectangular configuration and a transversely depending apron 40 constituted by sides 42, 44, 46 and 48 which extend downwardly and outwardly in a divergent direction. In this manner, the apron 40 advantageously engages with the surface 32 of the ring 26 in a substantially sealed relationship. One or more windows 50 may be incorporated into the apron for purposes of viewing the interior of the animal cage. In order to facilitate the handling of the cover 36, it may prove desirable to provide a laterally extending finger gripping tongue 52 either as an integral extension of the apron 40 or a separately applied member.

Figure 5:
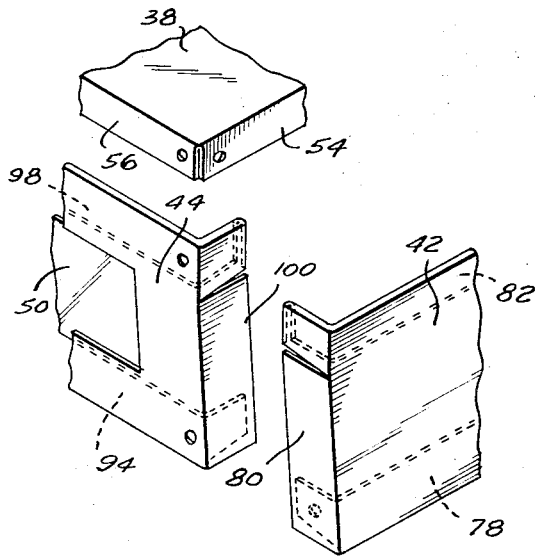
FIG. 5 is a similar view showing the folding of sections of these parts to facilitate their association one with the other.
Figure 6:
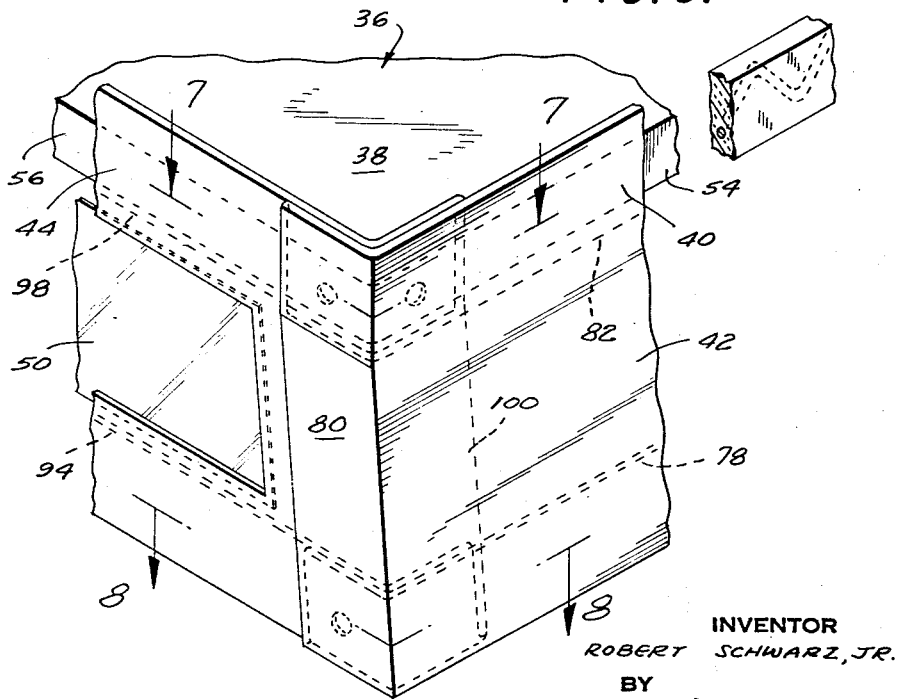
FIG. 6 is a similar perspective view on a larger scale showing the assembled and erected parts and the manner in which they define a corner of the filter cover.

The filter cover 36 may be erected from a blank that is a one-piece stamped member or constructed according to the illustrated embodiment in which four separate members are cut, folded and then assembled. As previously explained, the contemplated filter material is of relatively thin gauge and generally of the type not capable of supporting itself in any erected position. Accordingly, the illustrated embodiment of FIGS. 1 to 8 incorporates means for increasing the thickness of the material along predetermined zones for purposes of rigidifying the erected structure. This increased thickness is accomplished by providing for two or more plys of the sheet material along the selected rigidifying zones. Thus, the base panel 38 will include outwardly extending strips, 54, 56, 58 and 60. These extensions are bent downwardly as shown in FIG. 5 along the respective fold lines 62, 64, 66 and 68 during the erecting process. Sides 42 and 46 are substantial duplicates and are cut in the same manner illustrated in FIG. 3. The fold lines 70, 72, 74 and 76 define the respective extensions 78, 80, 82 and 84. These extensions are folded upon the fold lines in a manner exemplified by FIG. 5. The sides 44 and 48 are similarly constructed except for the window 50. Accordingly, the fold lines 86, 88, 90 and 92 cooperate to define the respective extensions 94, 96, 98 and 100. These extensions are folded upon the fold lines in a manner suggested by FIG. 5. The folded parts are then disposed and arranged relative to one another in a manner exemplified by FIGS. 5 and 6. As will be appreciated at this point of the assembly process, the sheet material is folded upon itself at substantially all the corners of the ultimately formed cover as well as the opened base. In this manner, the cover is rigidified by increased thicknesses by providing multiple plys along zones that cooperate to maintain the cover in an upright and erected disposition for purposes of withstanding the contemplated use and abuse during shipping and storage as well as actual filtration use. These increased thicknesses at the strategic locations and zones are illustrated in detail in FIGS. 5, 6, 7 and 8.

The illustrated holes or openings in the parts constituting the filter cover are utilized during the assembly process in maintaining the desired relative disposition of the parts. When this has been done, the superimposed plys are subjected to a predetermined amount of heat thereby causing a fusion or coalescence of the thermoplastic fibers. In this manner, the plys will be united and perform structurally as unitary members.

In FIGS. 12 to 16, a somewhat preferred embodiment of the invention is illustrated in which a single substantially rectangular sheet 150 of filter material is employed, together with rigidifying panels 152 and 154 to advantageously provide a foldable and collapsible construction. Either one or both of panels 152 and 154 may be transparent. In a successful application of the embodiment, a clear polyvinyl chloride was used to one of the panels and a white bleach paper board with a polyvinyl chloride coating was employed for the other. Naturally, other materials and thermoplastics could have been used. The rectangular sheet 150 may be similar to the filter material employed for the previously described embodiments, notably, a sheet consisting of glass fibers and a small proportion of thermoplastic fibers of the polyvinyl chloride variety.

Figure 12:
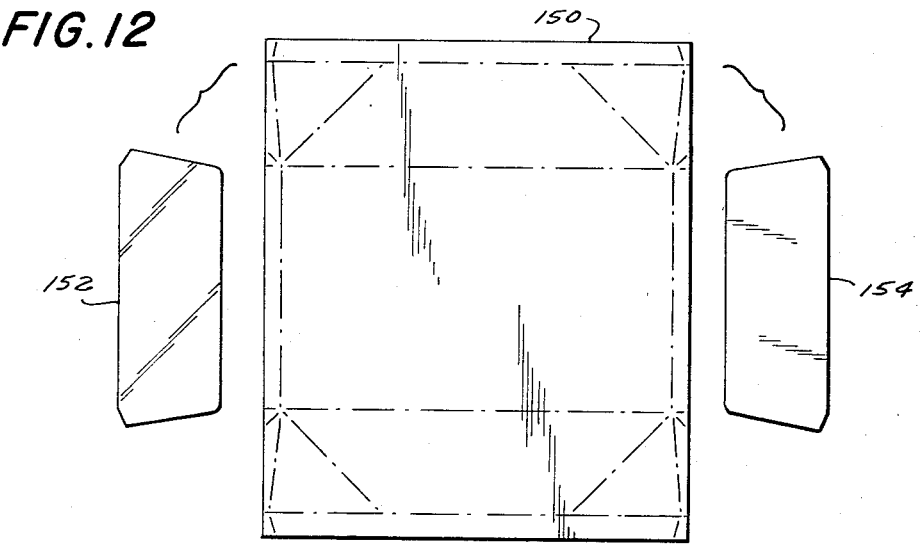
FIG. 12 is a top plan view of parts constituting a further and somewhat preferred embodiment of invention.
Figure 13:
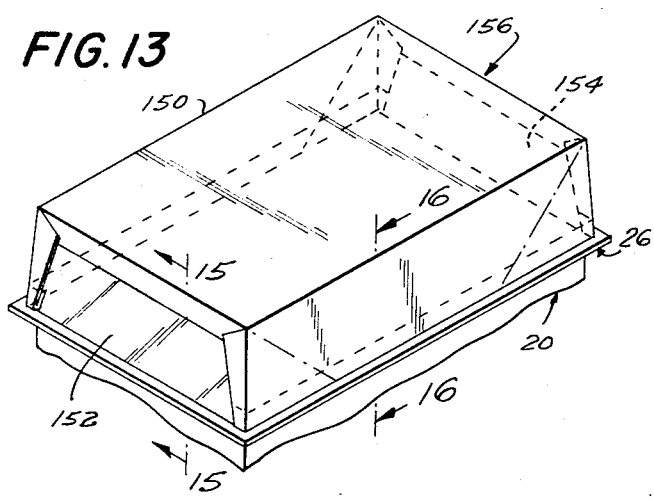
FIG. 13 is a perspective view of these parts in an assembled erected condition.
Figure 15:
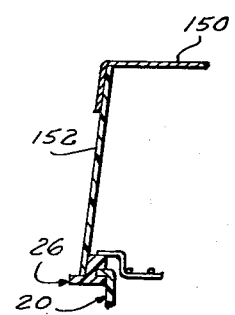
FIG. 15 is a fragmentary sectional view taken along the line 15—15 of FIG. 13.

The rectangular sheet 150 is folded from its flat condition shown in FIG. 12 along fold lines to the erected filter cover 156 shown in FIG. 13 at which position the sheet is secured to the exterior of the end panels 152 and 154 whereby this position is maintained. This attachment of parts is advantageously accomplished by merely subjecting the superimposed and overlapped surfaces to heat to cause the adjacent thermoplastic materials to coalesce and unite. In this manner, strength and rigidity is also obtained along these zones. The rectangular pattern of the filter sheet 150 obviously avoids the necessity of die cutting and eliminates space or exposure in the corners of the erected filter cover because of the overlapping present at these locations.

The erected filter cover 156 is essentially similar in configuration to the previously disclosed embodiments whereby cooperation with the gasket 26 over the tray 20 is assured.

Figure 14:
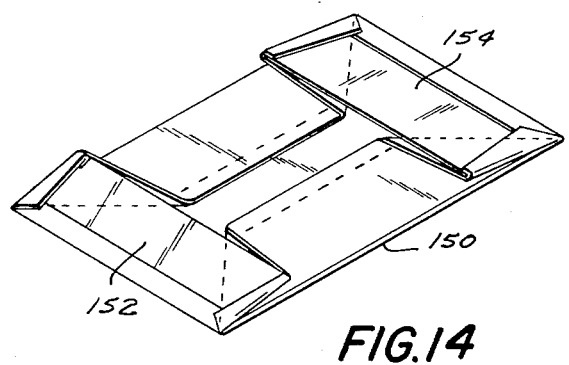
FIG. 14 is a similar view showing these assembled parts in a collapsed condition for shipping or storage.
Figure 16:
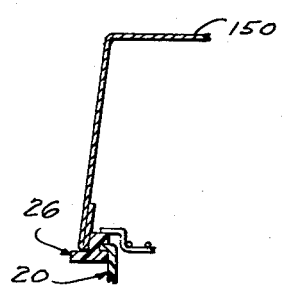
FIG. 16 is a fragmentary sectional view taken along the line 16—16 of FIG. 13.

The sheet 150 is conveniently provided with additional fold lines enabling the cover 156 to be collapsed into a substantially flat condition as typified in FIG. 14. Under these circumstances, the collapsed cover 156 will efficiently utilize space during shipping and storage.

Figure 9:
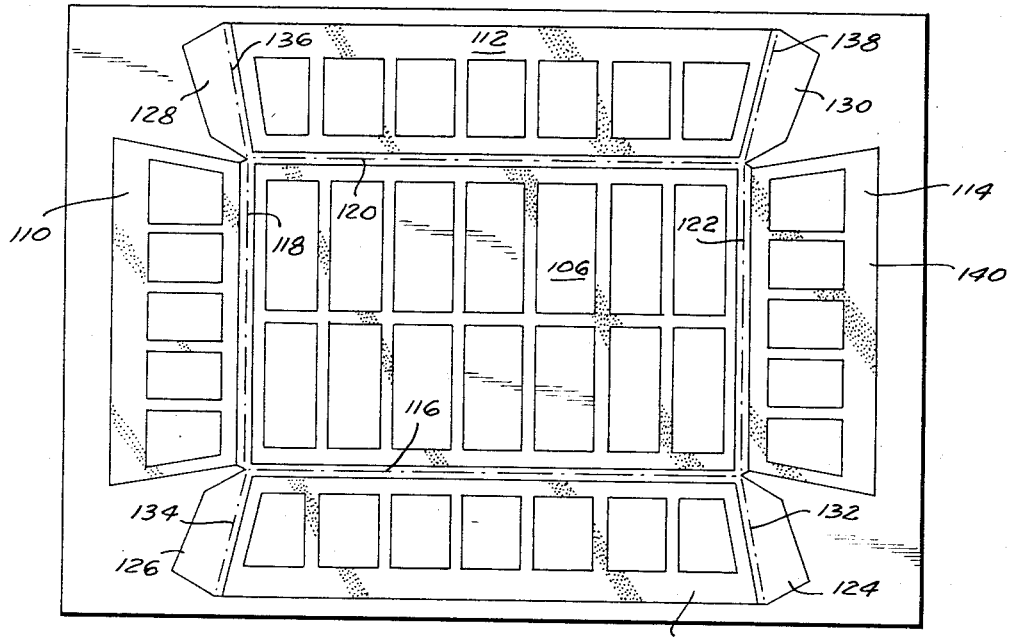
FIG. 9 is a top plan view of a web of filter material in accordance with another embodiment of this invention and in which the rigidifying structure is provided by a silk screen pattern applied to the web as shown.
Figure 11:
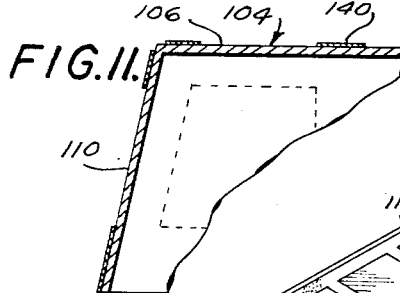
FIG. 11 is an enlarged fragmentary sectional view taken along the line 11—11 of FIG. 10.
Figure 10:
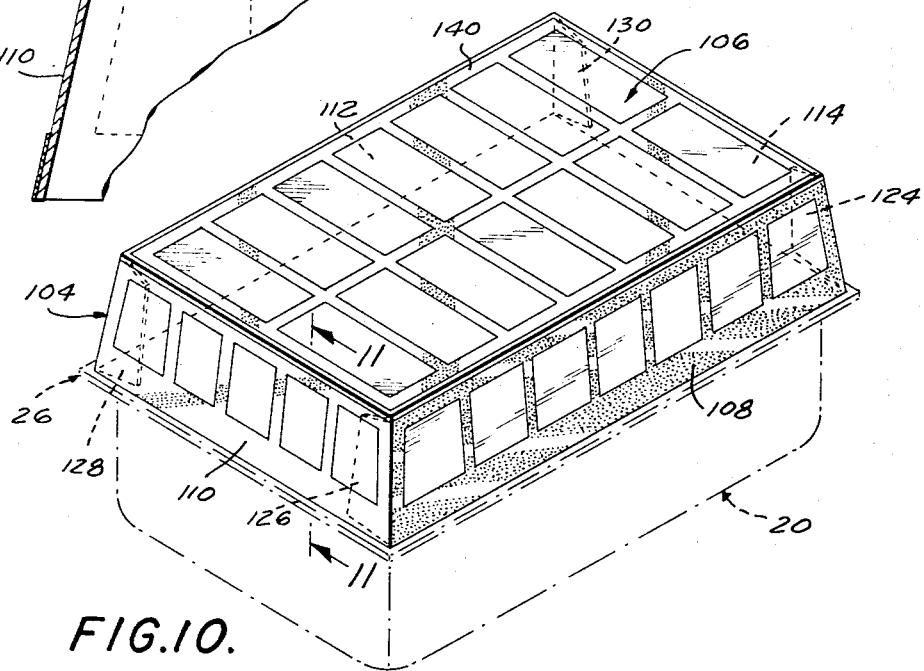
FIG. 10 is a cut, folded and erected filter cover made from the blank of FIG. 9.

As an alternative exemplary embodiment of rigidifying means for the filter cover contemplated by this invention, reference is now made to FIGS. 9, 10 and 11. In these figures, a filter cover 104 is adapted to be placed over an animal cage tray. This filter cover may be formed by stamping or suitably cutting either the illustrated one-piece member or series of members from a web of filter material. This filter material may be of the type employed in the previously disclosed embodiment or may be of another suitable type. Thus, the filter cover 104 will include a top panel 106 and four sides 108, 110, 112 and 114 extending laterally therefrom. These sides are integrally hinged or connected with the top panel 106 by the fold lines 116, 118, 120 and 122, respectively. The sides 108 and 112 also include integrally hinged tabs 124, 126, 128 and 130 and separated therefrom by the respective fold lines 132, 134, 136 and 138.

In order to rigidify the filter cover along selected zones, an additional thickness is introduced by means of a layer of material applied according to this embodiment by means of silk screening technique. Thus, a silk screened layer 140 is applied in accordance with the selected pattern which may be of the type illustrated in the subject FIGURES 9 to 11. In erecting the one-piece blank bearing the rigidifying layer, the tabs 124, 126, 128 and 130 are suitably secured to the adjacent sides 110 to 114 as the case may be as, for example, by means of a suitable adhesive. In all other respects the performance of the filter cover 104 is substantially similar to that of filter cover 36.

In summarizing the design of the filter sheet of this invention, balance among various properties must be attained. The important characteristics of the sheet may be summarized as follows:

(1) *Air permeability.*—The sheet must permit sufficient passage of air to provide ventilation of the cage. The minimal allowable level of air permeability is in the vicinity of 300 cc./70 seconds as measured with the Gurley densometer; 5 oz. can, 0.1 square inch opening.

(2) *Filtration efficiency.*—It is necessary that the sheet prevent the passage of very small air-borne particles. This requires that the air permeability property be provided by multitudinous small passages through the sheet. The fineness of the glass fibers is adjustable to obtain this characteristic. Thus, the combination of air permeability and filtration efficiency was achieved by including in the sheet some very fine glass fibers (micro-fibers), which provide very small openings and high internal surface.

(3) *Heat sealability.*—Vinyon, a highly thermoplastic fiber spun from a vinyl chloride copolymer in amounts between 40% and 50% of the sheet weight has proven satisfactory.

(4) *Stiffness.*—A certain degree of this property is best achieved by combining high bulk with a high degree of internal bonding. The bulk was obtained by including some relatively coarse, stiff glass fibers in the sheet, and bonding was provided by the use of vinal fiber spun from polyvinyl alcohol and is available in types which become highly adhesive under conditions of high temperature and moisture, such as exist in the dryer section of a paper machine. Beaten cellulosic fibers could be used in place of vinal but the latter is preferred.

(5) *Fold strength and scoring resistance.*—The addition of longer, stronger fibers to the sheet as, for example, Dacron, nylon or manila hemp fibers have been found useful in facilitating the folding and scoring of the sheet to the desired extent. A typical formulation for the filter sheet is given below, along with a list of the properties contributed by each component.

| Fiber | Percent by Weight in Sheet | Properties Imparted |
| --- | --- | --- |
| Vinyon | 45 | Heat Sealability. |
| ½-Micron Glass | 10 | Filtration Efficiency. |
| 5-Micron Glass | 25 | Stiffness and Bulk. |
| Dacron | 10 | Tear and Score Strength. |
| Vinal | 10 | Stiffness and Strength. |

There are obviously a number of other constructions which could meet the requirements for the filter sheet. For example, in place of Vinyon fiber, the sheet could be saturated or coated with a thermoplastic resin. Or, some of the glass fibers could perhaps be replaced with appropriate natural cellulosic fibers. Or, a non-heat-sealable filter sheet could be laminated to a porous heat-sealable sheet.

Thus, among others, the several aforenoted objects and advantages are most effectively attained. Air-borne viruses and diseases are satisfactorily filtered; and this includes the weaning period of newborn mice thereby enabling optimum productivity and breeding of experimental animals. In addition to preventing undersirable penetration of the animal cage from without, the filter cover maintains air-borne particles within the cage thereby contributing to cleaner breeding facilities.

Although several somewhat preferred embodiments of the invention have been disclosed and described in detail herein, it should be understood that this invention is in no sense limited thereby and its scope is to be determined by that of the appended claims.

I claim:

1. An animal cage comprising in combination: a tray for the animals and having an open top, a self-supporting filter cover of predetermined configuration on the tray, said filter cover being constructed and arranged to filter air-borne virus and disease transmitting particles, said filter cover being constructed of a relatively thin sheet of air and gas pervious imperforated material, said sheet material being of relatively low structural strength, integral strengthening means forming part of said filter cover for rigidifying said sheet in the predetermined configuration, said filter cover having a raised top and a downwardly depending side means providing an apron, said apron having a lower edge sealably receiving the tray and forming a seal with the top thereof, and the top and apron of said filter cover cooperate in providing sufficient surface area to insure adequate air and gas exchange into and out of the cage through the filter cover.

2. The invention in accordance with claim 1 wherein a grid is interposed between the top of the tray and the cover for maintaining the contained animals within the confines of the tray.

3. The invention in accordance with claim 1 wherein a sealing ring adaptor is interposed between the periphery of the top of the tray and the cover for sealing the junction therebetween.

4. The invention in accordance with claim 1 wherein the top of the filter cover comprises a substantially rectangular panel disposed over and spaced from the top of the tray, said apron extending around the panel and extending transversely therefrom to define essentially a truncated pyramidal configuration.

5. The invention in accordance with claim 4 wherein a window is provided in said apron for viewing the interior of the compartment defined by the tray and the cover.

6. The invention in accordance with claim 4 wherein a tab extends laterally from the panel and away from said apron to provide a gripping surface for handling the cover.

7. The invention in accordance with claim 1 wherein said strengthening means includes at least two plys of said sheet material along preselected zones of said cover, said plys being interconnected along said zones to provide an additional thickness of said material.

8. The invention in accordance with claim 1 wherein said strengthening means includes an additional layer of material along preselected zones of said cover to effectively increase the thickness of said sheet.

9. The invention in accordance with claim 1 wherein said material is composed of fibers of glass and organic resin having thermoplastic properties which permit one layer of said material to adhere to another layer of said material upon exposure to a predetermined amount of heat.

10. A self-supporting filter cover of predetermined configuration for placement on an open top tray of an animal cage, said filter cover being constructed and arranged to filter air-borne virus and disease transmitting particles, said filter cover being constructed of relatively thin air and gas pervious imperforate sheet material, said sheet material being of relatively low structural strength, integral strengthening means forming part of said filter cover for rigidifying said sheet in the predetermined configuration, said filter cover having a raised top and a downwardly depending side means providing an apron, said apron having a lower edge adapted to sealably receive the open top animal holding tray and form a seal with the top thereof, and the top and apron of said filter cover cooperate in providing sufficient surface area to insure adequate air and gas exchange into and out of the cage through the filter cover.

11. The invention in accordance with claim 10 wherein the top of the filter cover comprises a substantially rectangular panel disposed over and spaced from the top of the tray, said apron extending around the panel and extending transversely therefrom to define essentially a truncated pyramidal configuration.

12. The invention in accordance with claim 11 wherein a window is provided in said apron for viewing the interior of the compartment defined by the tray and the cover.

13. The invention in accordance with claim 11 wherein a tab extends laterally from the panel and away from said apron to provide a gripping surface for handling the cover.

14. The invention in accordance with claim 10 wherein said strengthening means includes at least two plys of said sheet material along preselected zones of said cover, said plys being interconnected along said zones to provide an additional thickness of said material.

15. The invention in accordance with claim 10 wherein said strengthening means includes an additional layer of material along preselected zones of said cover to effectively increase the thickness of said sheet.

16. The invention in accordance with claim 10 wherein said material is composed of fibers of glass and organic resin having thermoplastic properties which permit one layer of said material to adhere to another layer of said material upon exposure to a predetermined amount of heat.

17. The invention in accordance with claim 10 wherein said strengthening means includes zones of increased thickness for providing the requisite amount of rigidity to said cover.

18. The invention in accordance with claim 17 wherein said additional thickness includes a layer of silk screened material.

19. The invention in accordance with claim 17 wherein said additional thickness is provided by at least two layers of said sheet material superimposed upon one another and adhered to one another.

20. The invention in accordance with claim 10 wherein the sheet material is of substantially rectangular configuration and said strengthening means comprises a pair of spaced end panels, said sheet material being folded to overlap peripheral edges of the panels.

21. The invention in accordance with claim 20 wherein the folded sheet material comprises a substantially rectangular panel and the filter cover includes a peripheral apron extending around the panel and extending transversely therefrom to define essentially a truncated pyramidal configuration in which the apron includes said pair of spaced end panels.

22. The invention in accordance with claim 21 wherein one of said end panels is transparent for viewing the interior of the compartment defined by the tray and cover.

23. The invention in accordance with claim 22 wherein the sheet material is provided with additional folds whereby the cover is adapted to be folded to a collapsed substantially flat position from an erected position at which the apron defines the truncated pyramidal configuration.

24. An animal cage comprising in combination: a tray for the animals and having an open top, a self-supporting filter cover of predetermined configuration on the tray, said filter cover being constructed and arranged to filter air-borne virus and disease transmitting particles, said filter cover being constructed of a relatively thin sheet of air and gas pervious imperforate material, said sheet material being of relatively low structural strength, integral strengthening means forming part of said filter cover for rigidifying said sheet in the predetermined configuration, said filter cover having a raised top and a downwardly depending side means providing an apron, said apron having a lower edge sealably receiving the tray and forming a seal with the top thereof, and the top and apron of said filter cover cooperate in providing sufficient surface area to insure adequate air and gas exchange into and out of the cage through the filter cover, the sheet material being of substantially rectangular configuration and said strengthening means comprising a pair of spaced end panels, and said sheet material being folded to overlap peripheral edges of the panels.

25. The invention in accordance with claim 24 wherein the top of the folded sheet material comprises a substantially rectangular panel and the apron extending around the panel and extending transversely therefrom to define essentially a truncated pyramidal configuration in which the apron includes said pair of spaced end panels.

26. The invention in accordance with claim 25 wherein one of said end panels is transparent for viewing the interior of the compartment defined by the tray and cover.

27. The invention in accordance with claim 26 wherein the sheet material is provided with additional folds whereby the cover is adapted to be folded to a collapsed substantially flat position from an erected position at which the apron defines the truncated pyramidal configuration.

28. An animal cage comprising in combination: a tray for the animals and having an open top, a self supporting filter cover of truncated pyramidal configuration on the tray, said filter cover being constructed and arranged to filter air-borne virus and disease transmitting particles, said filter cover being constructed of a relatively thin sheet of air and gas pervious imperforate material, said sheet material being of relatively low structural strength, integral strengthening means forming part of said filter cover for rigidifying said sheet in the predetermined configuration, said filter cover having a raised top and a downwardly depending side means providing an apron, said apron having a lower edge sealably receiving the tray and forming a seal with the top thereof, and the top and apron of said filter cover cooperate in providing sufficient surface area to insure adequate air and gas exchange into and out of the cage through the filter cover, sealing means at the periphery of the top of the tray, said sealing means including a downwardly and outwardly beveled surface defining essentially truncated pyramidal configuration corresponding with the pyramidal configuration of the filter cover whereupon when the filter cover is placed on the sealing means, the junction between the filter cover and top of the tray is sealed.

29. The invention in accordance with claim 28 wherein the sealing means also includes a shoulder extending outwardly from the pyramidal surface of the sealing means, said shoulder adapted to serve as a resting surface for the lower edge of the cover.

References Cited

UNITED STATES PATENTS

| | | | |
|---|---|---|---|
| 2,019,216 | 10/1935 | Fogland | 119—32 |
| 2,422,438 | 6/1947 | Richards | 119—19 |
| 2,467,525 | 4/1949 | Fricke | 119—15 |
| 2,881,733 | 4/1959 | Young et al. | 119—15 |
| 3,058,446 | 10/1962 | Long | 119—30 |
| 3,106,801 | 10/1963 | Risacher | 47—17 |
| 3,122,127 | 2/1964 | Schechmeister et al. | 119—18 |
| 3,234,905 | 2/1966 | Olson | 119—5 |
| 3,265,059 | 8/1966 | Matthews | 128—1 |

SAMUEL KOREN, *Primary Examiner.*

HUGH R. CHAMBLEE, *Assistant Examiner.*